United States Patent [19]

Iioka

[11] 4,435,344
[45] Mar. 6, 1984

[54] METHOD FOR PRODUCING A HEAT-INSULATING PAPER CONTAINER FROM A PAPER COATED OR LAMINATED WITH A THERMOPLASTIC SYNTHETIC RESIN FILM

[75] Inventor: Akira Iioka, Inzaimachi, Japan

[73] Assignee: Nihon Dixie Company, Limited, Tokyo, Japan

[21] Appl. No.: 335,346

[22] Filed: Dec. 29, 1981

[30] Foreign Application Priority Data

Dec. 29, 1980 [JP] Japan .................................. 55-187575

[51] Int. Cl.$^3$ ............................................. B29D 27/00
[52] U.S. Cl. ...................................... 264/45.1; 156/79; 156/256; 229/3.1; 264/45.6; 264/53; 264/DIG. 5; 427/45.1; 427/373; 428/35
[58] Field of Search ................. 264/53, 51, 45.1, 45.6, 264/DIG. 5; 156/79, 256; 427/45.1, 373; 229/3.1; 428/35

[56] References Cited

U.S. PATENT DOCUMENTS

| | | | |
|---|---|---|---|
| 3,262,625 | 7/1966 | Russell et al. | 264/45.6 X |
| 3,300,553 | 1/1967 | Shelby | 264/45.6 |
| 3,390,618 | 7/1968 | McArdle. | |
| 3,769,056 | 10/1973 | Sincock | 264/45.6 X |
| 3,836,423 | 9/1974 | Wagner et al. | 264/53 X |
| 3,919,368 | 11/1975 | Seto | 264/51 X |
| 4,206,249 | 6/1980 | Suzuki et al. | 427/54.1 |

FOREIGN PATENT DOCUMENTS 836080 6/1960 United Kingdom .................. 264/53

*Primary Examiner*—Philip E. Anderson
*Attorney, Agent, or Firm*—Oblon, Fisher, Spivak, McClelland & Maier

[57] ABSTRACT

A heat-insulating paper container having good heat-insulating property which can be prepared easily at low cost is disclosed. The paper container is prepared by heating a paper container comprising a body member and a bottom member, wherein one surface of at least the container body member is coated or laminated with a thermoplastic synthetic resin film and the other surface of the body member is coated or laminated with the same or different thermoplastic synthetic resin film or an aluminum foil, to thereby foam the thermoplastic synthetic resin film and form a heat-insulating layer on at least one surface of the container.

11 Claims, No Drawings

METHOD FOR PRODUCING A HEAT-INSULATING PAPER CONTAINER FROM A PAPER COATED OR LAMINATED WITH A THERMOPLASTIC SYNTHETIC RESIN FILM

BACKGROUND OF THE INVENTION

This invention relates to a heat-insulating paper container having on its wall surface a foamed layer of a thermoplastic film and a method for producing such a container.

Several types of heat-insulating containers have been used commercially to pack hot liquids. A polystyrene foam heat-insulating container is one example. It is prepared by casting unfoamed polystyrene into a mold, heating the resin under pressure to foam it, and removing the foamed resin from the mold. Alternatively, a foamed styrene sheet may be shaped into a container. The resulting container has fairly high heat insulating ability, but it is not competitive costwise. With the current oil price hike and expected depletion of oil resources that demand an economical method for manufacturing heat-insulating containers with less energy, the high cost of the conventional method is a serious defect. As a further disadvantage, the outer surface of the foamed styrene heat-insulating container is not smooth and has low printability.

The conventional paper heat-insulating container can not be manufactured at low cost, and one reason is the complexity of the manufacturing process. One example is a container wherein the side wall of the body member is surrounded by a corrugated heat-insulating jacket. The process of manufacturing such container involves additional steps of forming the corrugated jacket and bonding it to the outer surface of the side wall of the body member. One defect of this type of container is that letters, figures or other symbols are printed on the corrugated surface and the resulting deformed letters or patterns do not have aesthetic appeal to consumers. Another defect is that the jacket is bonded to the side wall of the body member in such a manner that only the valley ridges contact the side wall, and the bond between the jacket and the side wall is so weak that the two will easily separate. Another type of paper heat-insulating container has a "dual" structure wherein an inner cup is given a different taper than an outer cup to form a heat-insulating air layer. The two cups are made integral by curling their respective upper portions into a rim. The side wall of the outer cap is flat and has high printability but again, the two cups easily separate. Another defect is that the dual structure increases the manufacturing cost. Therefore, the development of a paper container having great heat-insulating ability and which can be manufactured easily at low cost has been desired.

SUMMARY OF THE INVENTION

It is an object of this invention to provide a method for producing a paper container having a great heat-insulating ability and which can be manufactured easily at low cost.

Other objects and advantages of this invention will appear as the description proceeds.

DETAILED DESCRIPTION OF THE INVENTION

In the course of developing a water-proof paper container, the present inventors have unexpectedly found that a heat-insulating paper container completely attaining said objects can be obtained.

Most water-proofing paper containers are manufactured by blanking a container body member and a container bottom panel member from a paper sheet both surfaces of which are coated or laminated with a thermoplastic synthetic resin film such as polyethylene film and fabricating them into a container using a conventional cup-making machine. The inventors have unexpectedly found that when the so-fabricated water-proof paper containers are heated in an electric oven, the polyethylene film coating or lamination on the surface of the container is foamed to form a heat-insulating layer.

Without wishing to be limited by theory, the reason for the foaming of the polyethylene film is believed that when the paper is heated, the moisture inherently contained in the paper is evaporated and the evaporated moisture foams or causes a foaming action on the polyethylene film. In other words, it is believed that the moisture inherently contained in the paper constituting the container will serve as a foaming agent for the thermoplastic film coating or lamination on the surface of the container.

According to this invention, a paper composite container comprising a body member and a bottom panel member, wherein at least one surface of the container body wall must be coated or laminated with a thermoplastic synthetic resin film such as polyethylene film is used. The other surface of the body wall must be coated or laminated with a thermoplastic synthetic resin film such as polyethylene film or an aluminum foil. Both surfaces of the body wall have to be laminated or coated with some material, in order to avoid direct escape of moisture from the paper into atmosphere when the fabricated container is heated.

The heat-insulating paper container of this invention is typically prepared by blanking a container body member from a paper sheet one surface of which is coated or laminated with a thermoplastic synthetic resin film and the other surface of which is coated or laminated with the same or different thermoplastic synthetic resin film or an aluminum foil and blanking a container bottom member from this paper sheet or another paper sheet having no lamination or coating and then fabricating them into a paper container using a conventional cup-forming machine and heating the so-fabricated paper container to form the film coating or lamination.

A paper container having one surface of the body member laminated or coated with a thermoplastic film and the other surface coated or laminated with the same or different thermoplastic film or an aluminum foil may be prepared by other methods. For example, as disclosed in U.S. Pat. No. 3,390,618, a container body member is blanked out from a sheet one surface of which is coated or laminated with a thermoplastic synthetic resin film or an aluminum foil and a container bottom panel member is blanked out from this sheet or another sheet having no film or foil. They are fabricated into a container by using a conventional cup-forming machine so that the coated surface faces outward. A thermoplastic synthetic resin film which has been softened by heating is positioned in the opening of the container and the film is drawn by applying suction to line the inner surface of the container.

The thermoplastic synthetic resin layer of the so-manufactured container is then heated to foam it and form a heat-insulating layer on the wall surface of the container.

Alternatively, as taught by U.S. Pat. No. 4,206,249, a paper container is fabricated from a body member and bottom panel member blanked out from a sheet having no thermoplastic synthetic resin film or other layer. The inner and outer surfaces of the container are coated with a prepolymer of thermoplastic synthetic resin by spraying it and then the prepolymer is cured by applying ultra-violet rays to form a film in situ. The film on the wall surfaces of the so-formed paper container is then heated to foam it and form a heat-insulating layer on the wall surfaces.

Alternatively, a heat-insulating paper container of this invention may be prepared as follows:

(i) a body blank is cut out from a paper sheet one surface of which is coated or laminated with a thermoplastic synthetic resin film and the other surface of which is coated or laminated with the same or different thermoplastic synthetic film or an aluminum foil and then heated to foam the thermoplastic synthetic resin film to thereby form a heat-insulating layer, or alternatively, said sheet is heated to foam the thermoplastic synthetic resin film, and a body blank having a foamed heat-insulating layer is cut out from the heated sheet;

(ii) a bottom blank is cut out from a paper sheet at least one surface of which is coated or laminated with a thermoplastic synthetic resin film or an aluminum foil or one surface of which is coated or laminated with a thermoplastic synthetic resin film and the other surface of which is caoted or laminated with the same or different thermoplastic synthetic resin film or an aluminum foil or which is neither coated or laminated with such materials, and then said blank is optionally heated, if the sheet has the thermoplastic synthetic resin film, or alternatively a paper sheet one surface of which is coated or laminated with a thermoplastic synthetic resin film and the other surface of which is coated or laminated with the same or different thermoplastic synthetic resin film or an aluminum foil is optionally heated to foam the thermoplastic synthetic resin film to thereby form a heat-insulating layer, and a bottom blank having a foamed heat-insulating layer is cut out from the heated sheet; and (iii) the body blank having a heat-insulating layer on at least one surface and the bottom blank having or not having a heat-insulating layer are then fabricated into a heat-insulating paper container with a conventional cup-making machine.

Thermoplastic synthetic resin films which may be used in this invention include polyethylene, polypropylene, polyvinyl chloride, polystyrene, polyester, nylon and the like. Polyethylene is preferred. The term "polyethylene" includes low, medium and high density polyethylenes.

The paper sheet which is used in this invention preferably has a basis weight of 100 g/m$^2$ to 400 g/m$^2$. Moreover, the paper must have a moisture content of about 2 to about 10% i.e. at least about 2%, preferably about 4 to about 8.5%, and most preferably about 4.5 to 8%. Though the heating temperature and heating time will vary depending on the type of the paper sheet and the thermoplastic synthetic resin film used, the heating temperature generally varies from about 110° C. to about 200° C., and the heating time varies from about 20 seconds to about 4 minutes. By way of example, when a polyethylene film is used as a thermoplastic synthetic resin film for coating or lamination, the optimum result will be obtained if the moisture content of the paper is between about 5 to about 8% and the heating temperature is from 110° to 150° C. and the heating time is between 50 seconds to 2.5 minutes.

Any heating means such as hot air, electric heat or microwaves can be used. Heating by hot air or electric heat in a tunnel having transporting means such as conveyor is preferred for commercial production. The heat-insulating paper container of this invention may also be prepared batchwise by heating in a microwave or electric oven.

The thickness of the thermoplastic synthetic resin film coated or laminated on the paper sheet is not critical to this invention. As a non-limiting guideline, a film having a thickness of about 15μ to about 80μ, preferably about 20μ to about 50μ, most preferably 20 to 40μ may be used.

One can provide a foamed layer on a desired surface by changing the type and nature of the thermoplastic synthetic resin films to be coated or laminated on the paper surface. For example, when a film material having a relatively high melting point, for example high density polyethylene film, is used on the inner surface of the container body wall and a film material having a relatively low melting point, for example low density polyethylene film is used on the outer surface of the container body member, only the low density polyethylene film on the outer wall surface is foamed and the high density polyethylene film on the inner wall surface may remain unfoamed. Also, when the inner wall surface of container body member is coated or laminated with an aluminum foil and the outer surface is coated or laminated with a thermoplastic film, the film layer on the outer wall surface can be effectively foamed to form a heat-insulating layer. It should be noted that the reverse is possible.

The container bottom panel member makes no contribution to the heat insulation of the paper container. Therefore, it is not necessary to consider the foaming of the bottom panel member.

The heat-insulating paper container of this invention can be prepared more easily than the prior art heat-insulating paper container. Moreover, according to this invention, the amount of petroleum used can be remarkably reduced in comparison with the prior art foamed polystyrene heat-insulating container. Therefore, according to this invention, a paper container having heat-insulating property equal to or greater than that of the prior art paper or foamed polystyrene heat-insulating container can be produced at lower cost.

Moreover, according to this invention, only the moisture content in the paper sheet is utilized as a foaming agent for the thermoplastic film and no chemical foaming agent is contained in the film so that a container which does not contaminate the contents can be provided.

Furthermore, according to this invention, letters, figures and symbols are printed on the paper sheet prior to coating or laminating its surface with a thermoplastic film, so that even after the film is foamed to form a heat-insulating layer, the consumers can clearly recognize such letters through the heat-insulating layer.

The present invention will be further illustrated by the following examples.

EXAMPLE 1

A low density polyethylene was extrusion-coated in a thickness of 20μ on both surfaces of a paper sheet having a basis weight of 240 g/m² and a moisture content of 7%. A container body member and a bottom panel member were blanked from this sheet and they were fabricated into a container using a conventional cup-making machine. The total thickness of the paper sheet plus the polyethylene film was 0.34 mm. This paper container was heated in an electric oven at a temperature of 135° C. for 2 minutes. A paper container having a foamed polyethylene heat-insulating layer on both inner and outer surfaces was obtained. The thickness of the container body wall after foaming was increased to 0.620 mm.

EXAMPLE 2

A low density polyethylene was extrusion-coated in a thickness of 40μ on one side of a paper sheet having a basis weight of 260 g/m² and a moisture content of 5%, and a high density polyethylene was extrusion-coated in a thickness of 20μ on the other side. A container body member and a bottom panel member were blanked from this paper sheet and they were fabricated into a container with a conventional cup-making machine so that the wall surface coated with the low density polyethylene was inward. The so-fabricated container was heated in an electric oven at a temperature of 135° C. for 2 minutes to give a heat-insulating paper container having a foamed film layer on only the inner wall surface.

EXAMPLE 3

A low density polyethylene was extrusion-coated in a thickness of 40μ on one side of a paper sheet having a basis weight of 260 g/m² and a moisture content of 5%, and a high density polyethylene was extrusion-coated in a thickness of 20μ on the other side. This coated sheet was heated in an electric oven at a temperature of 135° C. for 2 minutes to give a paper sheet wherein only the low density polyethylene layer was foamed. A container body member and a bottom panel member were blanked from this sheet having the foamed polyethylene layer and they were fabricated into a heat-insulating container with a conventional cup-forming machine so that the foamed polyethylene layer was outward.

HEAT-INSULATION TEST

A heat-insulation test for the heat-insulating paper containers prepared in Examples 1 and 2 was carried out. For comparison, the heat-insulating property of the paper container before it was heated in Example 1 to foam the polyethylene layer was also tested. The temperature on the outer wall surface of the container was measured using a digital surface thermometer. The temperature of the contents of the container was measured using a mercury thermometer. The three types of container were charged with an equal amount of water having a temperature of 99° to 100° C. The temperature and the relative humidity of the test room were 20° C. and 60%, respectively. The test results are summarized in the following Table 1.

TABLE 1

| Time (min.) | Temp. of the outer wall surface (°C.) | | | Average temp. of the contents of the containers (°C.) |
| --- | --- | --- | --- | --- |
| | A | B | C | |
| 1 | 62 | 72 | 78 | 87 |
| 2 | 60 | 67 | 76 | 83 |
| 3 | 59 | 65 | 71 | 79 |
| 4 | 58 | 63 | 68 | 75 |
| 5 | 57 | 61 | 65 | 72 |
| 10 | 51 | 54 | 56 | 61 |

TABLE 1-continued

| Time (min.) | Temp. of the outer wall surface (°C.) | | | Average temp. of the contents of the containers (°C.) |
| --- | --- | --- | --- | --- |
| | A | B | C | |
| 15 | 46 | 48 | 49 | 53 |
| 20 | 43 | 44 | 45 | 48 |

There was little difference in the temperature of the contents in the three containers, but there was a great difference in the temperature on the outer wall surface of the three containers. The container having a foamed layer on both sides of the wall surface had the highest heat-insulating property, next came the container having a foamed layer on one side of the wall surface and the container having no foamed layer had very poor heat-insulating property.

What is claimed is:

1. A method for producing an insulating composite paper container which comprises heating a fabricated container having a container body member and a bottom panel member, wherein the container body member is formed of paper coated or laminated with a thermoplastic synthetic resin film on one surface thereof and coated or laminated with the same or different thermoplastic synthetic resin film or aluminum foil on the other surface thereof, wherein the bottom panel member is formed of paper which may or may not be coated or laminated with a thermoplastic synthetic resin film or aluminum foil and wherein the paper has a moisture content of at least about 2% and wherein the heating is performed at a temperature and for a time sufficient to form a heat-insulating layer on at least one surface of the container body member by a foaming action on at least one of the thermoplastic resin films of the container body member through the action of the moisture in the paper of the container body member.

2. A method according to claim 1, wherein the paper has a moisture content of about 2 to about 10%.

3. A method according to claim 1 wherein the thermoplastic synthetic resin film which is coated or laminated on one or both of the wall surfaces of the paper of the container body member is polyethylene.

4. A method according to claim 1 wherein one side wall surface of the paper of the container body wall member is coated or laminated with a low- or medium-density polyethylene and the other side is coated or laminated with a high-density polyethylene.

5. A method according to claim 1 wherein the outer surface of the paper of said container body member is coated or laminated with a thermoplastic synthetic resin film, the inner surface of the paper of the container body member is coated or laminated with an aluminum foil and the inner surface of the paper of said container bottom panel member is coated or laminated with an aluminum foil.

6. A method according to claim 1 wherein the fabricated container is heated at a temperature of about 110° C. to about 200° C. for a period of about 20 seconds to about 4 minutes.

7. A method according to claim 1 wherein the moisture content of the paper is between about 5 to about 8% and wherein the entire surface of the paper of the container body and bottom panel members is coated or laminated with a polyethylene film and is heated at a temperature of about 110° C. to about 150° C. for a period of about 50 seconds to about 2.5 minutes to cause a foaming action on the polyethylene synthetic resin film and form a heat-insulating layer.

8. A method according to claim 1 wherein the thermoplastic synthetic resin film is a polyethylene film.

9. A method according to claim 1 wherein the paper of the container has a basis weight of about 100 g/m² to about 400 g/m² and a moisture content of about 2 to about 10%.

10. A method according to claim 9 wherein the paper has a moisture content of preferably about 4 to about 8%.

11. A method according to claim 10 wherein the paper has a moisture content of most preferably about 4.5 to 7.5%.

* * * * *